United States Patent [19]

Block

[11] Patent Number: 5,753,033
[45] Date of Patent: May 19, 1998

[54] COMPOSITION AND METHOD TO REMOVE ASBESTOS

[75] Inventor: Jacob Block, Rockville, Md.

[73] Assignee: W. R. Grace & Co.-Conn., New York, N.Y.

[21] Appl. No.: 721,858

[22] Filed: Sep. 27, 1996

[51] Int. Cl.$^6$ .................................................. B09B 3/00
[52] U.S. Cl. ..................... 106/699; 106/14.05; 106/625; 106/716; 106/717; 106/772; 106/734; 106/815; 106/18.13; 106/18.14; 423/167.1; 428/688; 428/703; 588/242; 588/254; 588/901; 427/427
[58] Field of Search .......................... 106/14.05, 15.05, 106/18.11, 624, 625, 699, 18.14, 18.13, 713, 772, 774, 716, 734, 815; 428/688, 703; 588/242, 254, 901; 423/167.1; 427/427

[56] References Cited

U.S. PATENT DOCUMENTS

| | | |
|---|---|---|
| 112,650 | 3/1871 | Stevens . |
| 1,094,505 | 4/1914 | Whitney . |
| 3,297,516 | 1/1967 | Naumann et al. . |
| 3,551,228 | 12/1970 | Meth . |
| 3,867,218 | 2/1975 | Henry . |
| 3,914,184 | 10/1975 | Harada et al. . |
| 3,957,571 | 5/1976 | Bodycomb, Jr. . |
| 3,965,284 | 6/1976 | Xanthos et al. . |
| 4,055,458 | 10/1977 | Niederpriim et al. . |
| 4,328,197 | 5/1982 | Flowers . |
| 4,347,150 | 8/1982 | Arpin . |
| 4,356,057 | 10/1982 | Lalancette et al. . |
| 4,376,673 | 3/1983 | Cheung . |
| 4,395,304 | 7/1983 | Kern et al. . |
| 4,401,636 | 8/1983 | Flowers . |
| 4,474,742 | 10/1984 | Graceffa et al. . |
| 4,495,223 | 1/1985 | Lalancette et al. . |
| 4,555,304 | 11/1985 | Salzle . |
| 4,582,624 | 4/1986 | Enjo et al. . |
| 4,632,847 | 12/1986 | Lomasney et al. . |
| 4,693,755 | 9/1987 | Erzinger . |
| 4,810,280 | 3/1989 | Mao et al. . |
| 4,812,204 | 3/1989 | Delvaux et al. . |
| 4,818,143 | 4/1989 | Chou . |
| 4,866,105 | 9/1989 | Batdorf . |
| 4,897,213 | 1/1990 | Brink . |
| 4,921,572 | 5/1990 | Roche . |
| 4,971,086 | 11/1990 | Haug et al. . |
| 4,978,516 | 12/1990 | Yamada et al. . |
| 5,006,490 | 4/1991 | Logan et al. . |
| 5,019,291 | 5/1991 | Faulks . |
| 5,034,075 | 7/1991 | McMath . |
| 5,034,247 | 7/1991 | Batdorf . |
| 5,039,365 | 8/1991 | Rutledge, Sr. et al. . |
| 5,041,277 | 8/1991 | Mirick . |
| 5,085,838 | 2/1992 | Mason . |
| 5,091,053 | 2/1992 | Blonder et al. . |
| 5,096,692 | 3/1992 | Ek . |
| 5,143,757 | 9/1992 | Skinner . |
| 5,240,508 | 8/1993 | Gwilliam . |
| 5,258,131 | 11/1993 | Mirick et al. . |
| 5,258,562 | 11/1993 | Mirick et al. . |
| 5,264,655 | 11/1993 | Mirick et al. . |
| 5,317,056 | 5/1994 | Batdorf et al. . |
| 5,330,795 | 7/1994 | Batdorf et al. . |
| 5,439,322 | 8/1995 | Barnett . |
| 5,466,489 | 11/1995 | Stahl . |
| 5,514,222 | 5/1996 | Williams . |
| 5,516,973 | 5/1996 | Mirick et al. . |
| 5,543,120 | 8/1996 | Selby . |

*Primary Examiner*—Michael Marcheschi
*Attorney, Agent, or Firm*—Howard J. Troffkin

[57] ABSTRACT

A composition for transforming a chrysotile asbestos-containing material into a non-asbestos material is disclosed, wherein the composition comprises water, at least about 30% by weight of a boron tetrafluoride salt, free of or having only small amounts of an inorganic acid, an inorganic acid salt or a mixture thereof. A method of transforming the asbestos-containing material into a non-asbestos material using the present composition also is disclosed.

21 Claims, No Drawings

COMPOSITION AND METHOD TO REMOVE ASBESTOS

This invention was made with Government support under contract DE-AC02-76CH00016 awarded by the Department of Energy. The Government has certain rights to this invention.

RELATED APPLICATIONS

This application is related to the following commonly assigned applications, which have been filed simultaneously herewith and the disclosures of which have been incorporated herein by reference in their entirety:

(1) Ser. No. 08/721,854 filed Sep. 27, 1996, entitled COMPOSITION AND METHOD TO REMOVE ASBESTOS;

(2) Ser. No. 08/721,859 filed Sep. 27, 1996, entitled COMPOSITION AND METHOD TO REMOVE ASBESTOS;

(3) Ser. No. 08/721,856 filed Sep. 27, 1996, entitled COMPOSITION AND METHOD TO REMOVE ASBESTOS;

(4) Ser. No. 08/721,863 filed Sep. 27, 1996, entitled COMPOSITION AND METHOD TO REMOVE ASBESTOS;

(5) Ser. No. 08/721,857 filed Sep. 27, 1996, entitled FOAM COMPOSITION FOR TREATING ASBESTOS-CONTAINING MATERIALS AND METHOD OF USING SAME; and (6) Ser. No. 08/721,853, filed Sep. 27, 1996, entitled CORROSION INHIBITING COMPOSITION FOR TREATING ASBESTOS CONTAINING MATERIALS.

BACKGROUND OF THE INVENTION

This invention relates to methods and compositions for digesting the chrysotile form of asbestos ( "chrysotile asbestos") into non-asbestos material while the chrysotile asbestos is a component of a gypsum-containing cementitious composite, and especially to methods and compositions for the in-place digestion of chrysotile asbestos present in composite material that is bonded to a support structure.

Chrysotile asbestos is a serpentine asbestos fibrous-like material consisting of alternating layers of silica and magnesium oxide/hydroxide bound to each other through covalently shared oxygen.

At least in part because of its availability and unique fire resistance and thermal properties, chrysotile asbestos has been used commercially in a variety of building products, including, for example, fire resistant roofing shingles, acoustical plasters, fire resistant and thermally insulating coating compositions and the like. In the formation of fire resistant coating compositions, found to be appropriate for treatment by the present invention, small amounts of chrysotile asbestos were mixed with a settable bonding material, such as calcium sulfate hemihydrate, and, optionally, other materials such as vermiculite and the like. The composition was then applied to a structure where it forms a hardened gypsum-containing coating. For example, such compositions found considerable use in multi-story buildings wherein the gypsum-containing composition was applied as an adherent coating to steel girders, floor support plates, concrete decking and the like to provide fire resistance and high-temperature thermal insulation properties which aid in preventing damage and even possible collapse of such buildings in the event of fire.

In recent years asbestos has been classified as a regulated material in the United States. Federal, state and local government agencies have promulgated regulations dealing with the use and disposal of asbestos-containing building materials. The U.S. Environmental Protection Agency ("EPA") has defined asbestos-containing material ("ACM") as a material which contains greater than one percent (1%) asbestos. In accordance with regulatory procedures, various safeguards are employed to protect workers from inhaling asbestos fibers during removal or demolition activities. Such safeguards include, among others, requiring workers to wear approved respirator or breathing apparatus, as well as protective clothing, requiring any area in a building in which asbestos-containing material is being removed to be isolated or enclosed from the remainder of the building, and requiring the enclosed work area to be kept at a negative pressure by the use of special apparatus equipped with HEPA filters to prevent airborne asbestos fibers from leaving the work area. Such isolation of the work area is an expensive and time consuming part of the process.

Generally, prior art methods for handling asbestos-containing building materials have taken several approaches. One approach has been to chemically alter asbestos fibers before using them in building products. This approach is discussed, for example, in U.S. Pat. Nos. 4,328,197 and 4,401,636, both to Flowers, and in U.S. Pat. No. 4,474,742 to Graceffa et al.

Greceffa et al (U.S. Pat. No. 4,474,742) teach treatment of asbestos with hydroxamic acid and iron chelating agents to remove the iron present in the asbestos based on the presumption that the iron is the harmful component. In the Flowers patents (U.S. Pat. No. 4,328,197 and U.S. Pat. No. 4,401,636), one is taught to contact asbestos fibers with an aqueous solution of a weak base/strong acid or a strong base/weak acid salt of manganese, chromium, cobalt, iron, copper or aluminum or mixtures thereof, to convert the asbestos fibers into a metal-micelle product. In general, the process contemplated by Flowers is effected by preparing a slurry of asbestos fibers in an aqueous solution of the appropriate salt, effecting the conversion of the asbestos fibers to metal-micelle fibers in the slurry, and recovering the metal-micelle fibers from the slurry for use in the subsequent preparation of the desired fiber-containing end product.

Another approach is to treat previously formed asbestos-containing building materials by encapsulating the materials to thereby prevent the asbestos fibers from becoming airborne. A resinous encapsulating coating material typically would be applied by spraying, brushing or troweling. Care must be taken when using encapsulating methods so as not to physically damage the building material being encapsulated. Encapsulation is a containment method and, thus, the encapsulated material remains in place during the life of the building.

A number of removal techniques have been proposed, and each has its advantages and disadvantages. For example, it has been proposed to simply scrape or chip away at dry untreated asbestos-containing material and to collect the scrapings for discard. This technique, which is referred to as dry removal, is generally considered unacceptable by regulatory agencies since it provides no safeguard against the release of airborne asbestos particles.

Dry vacuum methods have been attempted to overcome the problem of dry removal by incorporating an exhaust filtering system to prevent pollution to the outside environment and by using sealed containers for storing and discarding the collected asbestos-containing material. One of the disadvantages of this dry vacuum method is that the bond between the dry building material and the underlying surfaces on which it is coated may be stronger than the vacuum capabilities of the equipment. In those cases, it is necessary to dislodge at least a portion of the asbestos-containing material by scraping or chipping, which has the same limitations as the dry removal process described above.

Wet removal processes have been developed as a means for reducing the problems associated with the various dry removal techniques. Wet removal generally involves wetting a building material with water or water-surfactant solution to soften it and to thereby facilitate its removal. Wet removal clearly represents an improvement over dry removal. However, the use of water as a softening agent is not entirely satisfactory because water penetrates slowly, does not completely wet most building materials, and tends to run off the surfaces being treated.

Over the past several years, wet removal techniques have been improved by devising more effective wetting and/or softening compositions. Recent U.S. patents which relate to such improved wet removal techniques include, for example, U.S. Pat. No. 4,347,150 to Arpin; U.S. Pat. No. 4,693,755 to Erziner; and U.S. Pat. No. 5,258,562 to Mirick et al.

The Arpin patent discloses a technique for wetting and removing friable insulating materials from an underlying substrate using a two-part wetting system. The first component comprises an aqueous alkali metal silicate dispersion blended with a cationic or nonionic surfactant and the second component comprises a mixture of an acrylic latex containing a reagent that is reactive with the alkali metal silicates in the first part. The two parts are stored separately and are mixed shortly before use to form a stripping composition which facilitates the removal of the building material while encapsulating the individual asbestos fibers contained therein. The removed material must be handled as an asbestos-containing material.

The Erzinger patent exemplifies a wet method for removing asbestos-containing materials from a substrate. This patent discloses applying a composition containing a cellulosic polymer to the asbestos-containing material, allowing the cellulosic polymer-containing composition time to penetrate and wet the asbestos-containing material, removing the wet material from the underlying substrate by mechanical forces, and collecting the removed material for discard.

The Mirick et al patent is centered on the concept of removing asbestos fiber containing building material by applying a dilute aqueous solution of an acid, which may include a separate source of fluoride ions such as an alkali metal or ammonium salt of hydrofluoric acid, to the building material for the purpose of conditioning the material to aid in its removal while partially converting the asbestos fibers. The building material, after having been treated with the dilute acid solution, preferably is removed for further treatment and/or discard. Mirick et al further contemplate that the wet building material, once removed, can then be digested by immersing the material into a bath of an acid solution, preferably with heating and agitation, until all of the asbestos material has been destroyed.

The problems of wet removal techniques include the requirements of physical removal and handling of the wet asbestos-containing material. In addition, the removed material must be further treated to destroy the remaining asbestos component if the material is to be discarded as a non-asbestos-containing material.

In the process described in Mirick et al. in which a combination of acid and fluoride source is used, the formed solution generates excessive hydrogen fluoride noxious gas while in storage and during application which presents a health hazard to the applicator. The Office of Safety and Health Administration ("OSHA") has set an upper permissible exposure limit of three (3) parts per million of hydrogen fluoride in the atmosphere.

While there have been improvements in the treatment and handling of asbestos-containing building materials in recent years, the search continues for still further improvements.

SUMMARY OF THE INVENTION

It is an object of the invention to provide an improved composition for transforming chrysotile asbestos to non-asbestos material.

It is another object of the invention to provide an improved composition and method for treating gypsum-containing cementitious building materials which contain chrysotile asbestos to transform the building materials to non-asbestos materials (i.e., materials which contain less than 1% chrysotile asbestos), while they are part of the building environment and supported on an underlying substrate.

Another object is to treat a building material which contains gypsum, chrysotile asbestos and, optionally, other components, such as porous aggregate particulate as, for example, vermiculite, while part of a building structure, to transform the building material to a non-regulated material, without removing the building material from its underlying substrate and without substantially impairing the physical integrity and heat insulating properties of the building material.

Another object is to provide a treating composition which does not utilize any acid, or at most utilizes only very low concentration of acid, yet which is capable of efficiently transforming chrysotile asbestos-containing building materials into non-asbestos materials, while the building materials are part of the building environment and supported on an underlying substrate.

A still further object is to provide a treating composition which does not generate hydrogen fluoride gas in excess of present OSHA limits during storage and use.

In accordance with the invention, these and other objects and advantages are achieved by the present composition and method for transforming chrysotile asbestos material to non-asbestos material. The composition comprises a unique combination of water, a high concentration of at least one boron tetrafluoride salt of ammonia, an alkali metal or alkaline earth metal, and, optionally, a very low concentration (i.e., from 0 up to about 5% by weight, based on the total weight of the composition) of an inorganic acid or acid salt. The present composition is applied to the building materials in a manner which permits absorption of from about 8 to 20 parts by weight of treating composition per part by weight of chrysotile asbestos contained in the material being treated.

DETAILED DESCRIPTION OF PREFERRED EMBODIMENTS

The present invention is intended for the treatment of gypsum-containing cementitious materials which contain chrysotile asbestos fibers to transform the building materials to non-asbestos materials. The present invention is especially useful for decomposing chrysotile asbestos fibers contained in gypsum-based building materials that have been previously applied to the structural components, such as steel beams, decking and the like of buildings as coatings thereon to provide fire and heat resistance thereto and to provide an asbestos free coating which retains its integrity and its fire and heat resistance properties on the substrate. Finally, the present invention provides a composition which can decompose chrysotile asbestos fibers without generation of noxious hydrogen fluoride under storage and use conditions.

The present invention is directed to the use of a treating composition which is an aqueous solution or dispersion of at least one boron tetrafluoride salt of ammonia, an alkali metal or an alkaline earth metal. The preferred salts are the alkali metal tetrafluooborates and, more specifically sodium tetrafluoroborate. The boron tetrafluoride salt should be soluble in the aqueous treating compositions of the present invention in the amounts described hereinbelow. The boron tetrafluoride salt component is employed in the present composition in high concentrations of at least about 10%, preferably at least about 20% and, most preferably, at least about 30% by weight, based on the weight of the treating composition, up to the saturation point of the salt in the aqueous system.

The present composition preferably does not contain any added acid component. However, an acid component may be added to the present composition in an amount of up to about 7%, preferably up to about 5%, based on the weight of the composition. The acid component, when present, can be selected from any inorganic acid or inorganic acid salt or mixtures thereof. The acid component should have a pKa of up to about 2.5, and preferably up to about 2.2. Further, the acid component should be highly soluble in water to form the present composition. Preferred inorganic acids include, for example, sulfuric acid, nitric acid, phosphoric acid, hydrochloric acid and mixtures of such acids. The most preferred acid is phosphoric acid. In addition, small amounts (up to about 5%, preferably up to about 2% by weight of the acid component) can be in the form of an organic acid. The preferred inorganic acid salts are the half acid salts, as for example, ammonium and alkali metal bisulfates and the like. The preferred salts are the ammonium salts of the half acids.

It has unexpectedly been found that by employing high concentrations of at least one boron tetrafluoride salt with no added acid (or at most very low amounts of acid) the treating compositions of the present invention can be stored and used to transform chrysotile asbestos-containing building materials to non-asbestos materials while in place in a building environment without generating noxious hydrogen fluoride gas in amounts which are unacceptable for commercial application, as exemplified by OSHA standards. This represents a major improvement over prior art asbestos treating compositions which rapidly generate large quantities of hydrogen fluoride gas when used, thus creating a dangerous work area. It has also been found that because there is little if any acid added to the present treating compositions, the present compositions are much less corrosive than prior art compositions.

The present treating compositions are particularly useful for treating building materials which contain gypsum in addition to chrysotile asbestos, since their use results in the transformation of the chrysotile asbestos containing material to a non-asbestos material (i.e., a non-regulated material containing less than 1% by weight asbestos) while permitting the building material to remain in place as part of the building structure.

It is believed, though not meant to be a limitation on the present invention, that when the composition of the present invention contacts chrysotile asbestos, the tetrafluoraborate salt, when in contact with the chrysotile asbestos material, generates a minute amount of hydrogen fluoride which is immediately consumed by reaction with silicon atoms of the chrysotile asbestos contained in the material being treated. This reaction further generates hydrogen fluoride at a rate which permits immediate reaction with additional silicon atoms until essentially all of the chrysotile is transformed to a non-regulated material and essentially no hydrogen fluoride gas is lost to the atmosphere. It has been unexpectedly found that the present compositions do not produce hydrogen fluoride in excessive amounts while in storage nor directly or indirectly cause generation and expelling of HF gas when in contact with chrysotile asbestos.

The present treatment composition may be readily applied to chrysotile asbestos containing cementitious coatings in any manner so that from about 8 to 20 parts by weight, preferably 9 to 15 parts by weight, of the aqueous treating composition is applied per part by weight of the chrysotile asbestos in the material being treated. The amount to be applied will depend on the amount of chrysotile asbestos initially present in the material, the concentration of the boron tetrafluoride salt and acid, if any, in the treating composition, and the thickness and absorptive capacity of the material being treated. The exact amount can be readily determined by small scale application and testing.

When further occupancy of the building or treated area is planned, even though the present treating composition is significantly less corrosive than prior art compositions, it is typical to add agents to the present composition which will inhibit the corrosion of metallic substrate materials (e.g. steel beams, galvanized corrugated decking, steel pipes and the like) to which the material being treated is attached and/or in vicinity thereof. It has been found that certain specific materials are useful as corrosion inhibiting agents for a broad spectrum of metals when part of the present treating composition. These agents, and their incorporation in treating compositions described herein which decompose chrysotile asbestos into a non-asbestos material and the utilization of such treating compositions to transform the asbestos-containing cementitious material to a non-regulated material are fully described in a concurrently filed, copending application, U.S. Ser. No. 08/721,853, filed Sep. 27, 1996, entitled CORROSION INHIBITING COMPOSITION FOR TREATING ASBESTOS CONTAINING MATERIALS, the disclosure of which is incorporated herein in its entirety by reference.

The method of the present invention transforms chrysotile asbestos-containing material into a material which contains very little, if any, chrysotile asbestos when measured, for example, by polarizing light microscopy, X-ray diffraction, or other conventional method. The resultant treated material contains less than one percent (1%), and normally less than one-half of one percent (0.5%) chrysotile asbestos in the overall structure of the resultant material. Thus, the material treated by the present composition results in a product which meets the U.S. governmental standards of a non-regulated asbestos-free material which may be safely handled by ordinary means. Further, it has been unexpectedly found that the present composition and method provides this transformation without causing a degradation of the cementitious material and, thereby, permits the material to remain in place and to continue to provide the functions of fire resistance, etc. for which it was initially installed.

The chrysotile asbestos contained in the cementitious material is substantially completely transformed to a non-asbestos product while in place and part of the cementitious material. Typically, at least about eighty five percent, and preferably at least about ninety percent, of the chrysotile fibers are decomposed by the present composition and method to provide a non-regulated safe product without degradation of the cementitious material and, thereby, not requiring removal of the material nor detracting from the properties of the cementious coating material.

All that is necessary to achieve the decomposition of the chrysotile asbestos fibers in accordance with the present invention is to wet the material containing the chrysotile fibers with the treating composition, for example, by spraying or brushing the material with the treating composition. In the case of asbestos-containing building materials, such as fireproofing materials coated on girders, beams and floor support plates, this can be done by spraying the treating composition in the form of a solution, dispersion, gel or foam (e.g., a foam which is stable for at least about 1 minute, and preferably for at least about 60 minutes) directly onto the asbestos-containing material, preferably while it is in place in the building environment. It is unnecessary to disturb the asbestos-containing materials since the treating compositions typically will penetrate into the building materials and contact the asbestos fibers contained therein. In those cases where it is desirable to increase the rate of penetration of the treating composition into the building material, one or more wetting agents may be added to the treating composition. For example, an anionic surfactant, such as linear alkyl sulfonates, sodium lauryl sulfates, polyalkoxy carboxylates, or a non-ionic surfactant, such as alcohol alkoxylates, alkyl phenol ethoxylates, polyoxyethylene esters and polyalkylene oxide block copolymers, can be added to the treating composition in conventional amounts, e.g., in amounts of up to about 5% by weight based on the total weight of the composition, to increase the rate of penetration of the treating composition into the building material and the resultant wetting of the asbestos fibers. Excellent wetting has been achieved in most cases, however, with the treating composition alone, without additional wetting agents.

The present treating composition should be applied to the gypsum-containing cementitious building material in manners which permit a total application of from about 100 to 200% by weight, preferably from about 125 to about 175% by weight, of the subject composition based on the weight of the cementitious building material. The exact amount will depend on the concentration of the chrysotile asbestos contained in the building material being treated.

Because of the high concentration of boron tetrafluoride salt in the treating compositions of the invention, the desired asbestos transformation may be achieved by a single application of the treating composition on the building material while it is in place in the building environment. However, in some cases it may be necessary or desirable to make successive applications, preferably without any intermediate drying step, until the desired degree of digestion of the chrysotile asbestos fibers is achieved.

The preferred manner of applying the subject treating composition to the material is by applying the composition in the form of a foam directly onto the major free surface(s) of the building material. As the material to be treated is in the form of a coating on a substrate building component, usually one major surface is exposed and free for application of the subject composition. Spraying of the aqueous treating composition may require successive applications, preferably without any intermediate drying step(s) between applications. Application of a foamed aqueous treating composition provides an extended contact time and a pseudo-encapsulation of the material being treated while the transformation is occurring. The formation of the foamed composition and its specific utilization in the instant method of transforming chrysotile asbestos-containing building materials to non-asbestos materials is fully described in concurrently filed, copending U.S. application Ser. No. 08/721,857, filed Sep. 27, 1996, entitled FOAM COMPOSITION FOR TREATING ASBESTOS-CONTAINING MATERIALS AND METHOD OF USING SAME, the disclosure of which is incorporated herein by reference.

It has been found that when a chrysotile asbestos-containing material is transformed in place in accordance with the present invention, the physical integrity and adherence of the resulting non-asbestos material to the underlying substrate are such that it may be left in place to perform the fireproofing or other function for which the asbestos-containing material was originally installed. The resultant material subsequently may be treated by spraying or the like with water or with a mild alkaline solution, such as sodium bicarbonate, calcium carbonate, sodium carbonate, magnesium hydroxide or the like in order to neutralize any acid that might be present in the material.

Even though it has been found that building materials which have been treated in place with the present treating compositions to transform any asbestos contained therein to non-asbestos material essentially maintain their physical integrity and adherence to the underlying substrate, there are cases when it is necessary or desirable to strengthen the material or its adherence to the substrate. This can be accomplished by applying a polymeric binding agent to the material, either before the building material has been initially wet with the treating composition or after the building material has been treated and/or rinsed and/or neutralized as described above.

The method of the invention, as applied to the abatement of asbestos in buildings, may typically include the step of removing any obstructions, such as interior partitions, ceilings and column covers, to expose the asbestos-containing material to be treated. This will enable the sampling and testing of the material to determine its composition and other relevant characteristics, thereby facilitating the selection of an optimum asbestos treatment composition and treatment procedure in accordance with the present invention. The treatment composition is then applied directly to the asbestos-containing material while in place in amounts described above to provide a non-regulated material. The resultant material may be further treated with water and/or a neutralizing agent.

One of the advantages of the invention is that it enables building materials to be treated in place without destroying their physical integrity and adherence to their substrate such that the materials may be left in place to perform their originally intended function after the asbestos containing material has been transformed to non-asbestos material.

The following examples are intended to illustrate the invention without imposing limits on the scope of the invention, as defined by the claims appended hereto. All parts and percentages are by weight unless otherwise indicated.

EXAMPLE 1

Several solutions of sodium tetrafluoroborate (NaBF$_4$) were prepared by mixing the indicated amount of sodium tetrafluoroborate with water, as indicated in Table I below. These solutions were added to a simulated fireproofing material which contained 0.7 parts chrysotile asbestos, 1.5 parts vermiculite and 3.8 parts of gypsum. The respective solutions were allowed to remain in contact with the simulated fireproofing material for seven days (without stirring) in a closed plastic container. After seven days, the mixtures were filtered, washed with water, dried and analyzed for chrysotile asbestos by X-ray diffraction. The composition of the various solutions and the results of the analyses are shown in Table 1.

TABLE 1

| NaBF$_4$ (parts) | H$_2$O (parts) | pH (initial) | pH (after 7 days) | Residual Chrysotile (%) |
|---|---|---|---|---|
| 4.6 | 4.4 | 2.6 | 2.7 | 0.65 |
| 4.0 | 5.0 | 2.5 | 2.6 | 0.76 |

The results show that chrysotile asbestos decomposition was achieved using an acid-free treating solution of the present invention and the resultant product was a non-regulated product having a residual chrysotile content of under 1%.

EXAMPLE 2

Example 1 was repeated except that the treating solution and the simulated fireproofing material was permitted to remain in contact for eleven days instead of seven days. The results of this Example are shown in Table 2.

TABLE 2

| NaBF$_4$ (parts) | H$_2$O (parts) | pH (initial) | pH (after 11 days) | Residual Chrysotile (%) |
|---|---|---|---|---|
| 4.6 | 4.4 | 2.6 | 2.6 | >0.2 |

The resultant product was a non-asbestos material which retained its physical integrity.

What is claimed is:

1. A method of treating a building material containing chrysotile asbestos, wherein said building material has been applied to a substrate in a building, comprising:
  (a) providing an admixture composition derived from admixing (i) water, (ii) at least about 10% by weight of at least one alkali metal, alkaline earth metal or ammonium tetrafluoroborate salt, and (iii) up to about 7% by weight of an inorganic acid, an inorganic acid salt or mixtures thereof;
  (b) applying said admixture composition to the chrysotile asbestos-containing building material; and
  (c) permitting said admixture composition to remain in contact with the building material for a sufficient period of time to reduce the amount of chrysotile asbestos contained therein to less than 1% by weight of the treated material.

2. The method of claim 1, wherein the building material is a gypsum-containing cementitious building material.

3. The method of claim 1, wherein said composition is applied in the form of a foam.

4. The method of claim 1, wherein said composition further contains a metal corrosion inhibiting agent.

5. The method of claim 1, wherein the tetrafluoroborate salt is present in a concentration of at least about 30 weight percent and is selected from the group consisting of ammonium, alkali metal and alkaline earth metal tetrafluoroborates and mixtures thereof.

6. The method of claim 2 or 5, wherein said composition further contains a component capable of inhibiting corrosion of metals in contact therewith.

7. The method of claim 1, 2, 3, 4 or 5, wherein said composition is applied to the building material in an amount of from about 8 to about 20 parts by weight based on the weight of chrysotile asbestos contained in the building material being treated.

8. A composition capable of transforming an asbestos-containing material to a material containing less than 1% by weight of chrysotile asbestos, comprising a mixture of (a) water, (b) at least one alkali metal, alkaline earth metal or ammonium tetrafluoroborate salt, and (c) up to about 7% by weight, based on the weight of the composition, of an inorganic acid, an inorganic acid salt or mixture thereof, wherein the tetrafluoroborate salt is present in a concentration of from at least about 10 weight percent of the composition.

9. A composition capable of transforming an asbestos-containing material to a material containing less than 1% by weight of chrysotile asbestos derived from admixing (a) water, (b) at least one alkali metal, alkaline earth metal or ammonium tetrafluoroborate salt, and (c) an inorganic acid, an inorganic acid salt or mixture thereof, wherein the tetrafluoroborate salt is added at a concentration of from at least about 10 weight percent of the composition, the acid component (c) is added at a concentration of up to about 7% by weight, based on the weight of the composition and said acid component (c) has a pKa of up to about 2.5.

10. The composition of claim 8 or 9, wherein the tetrafluoroborate salt is an alkali metal tetrafluoroborate.

11. The composition of claim 8 or 9, which is substantially free of acid.

12. The composition of claim 8 or 9, wherein the acid component (c) is present in a concentration of up to about 5% by weight.

13. The composition of claim 8 or 9, wherein the tetrafluoroborate salt is present in a concentration of at least about 30 wt percent based on the weight of the composition.

14. The composition of claim 8 or 9, wherein said mixture further contains a component capable of inhibiting corrosion of metals in contact therewith.

15. The composition of claim 8 or 9, wherein said mixture further contains a component capable of causing said composition to be in the form of a foam which is stable for at least about 1 minute.

16. The composition of claim 10, wherein said mixture further contains a component capable of inhibiting corrosion of metals in contact therewith.

17. The composition of claim 10, wherein said mixture further contains a component capable of causing said composition to be in the form of a foam which is stable for at least about 1 minute.

18. A cementitious product adhered to a building substrate suitable for providing fireproofing properties to said substrate formed by the method comprising:

(a) applying, to a cementitious composition comprising a hydrated cement, porous aggregate particulate and chrysotile asbestos, an admixture composition derived from admixing (i) water, (ii) at least about 10% by weight of at least one tetrafluoroborate salt of ammonium, alkali metal, alkaline earth metal or mixtures thereof, and (iii) up to about 7% by weight of an inorganic acid, an inorganic acid salt or mixtures thereof;

(b) permitting said admixture composition to penetrate the cementitious composition and contact the chrysotile asbestos contained therein; and (c) allowing said admixture composition to remain in contact with the cementitious composition for a sufficient period of time to provide a cementitious product having less than 1% by weight of chrysotile asbestos based on the weight of the product adhered to the building substrate.

19. The product of claim 18, wherein said composition is applied in the form of a foam.

20. The product of claim 18, wherein the particulate is vermiculite.

21. The product of claim 18, 19 or 20, wherein said admixture composition is applied to the cementitious composition in an amount of from about 8 to about 20 parts by weight based on the weight of chrysotile asbestos contained in the building material being treated.

* * * * *